US012771626B2

(12) United States Patent
Teshome et al.

(10) Patent No.: US 12,771,626 B2
(45) Date of Patent: Oct. 20, 2026

(54) MANAGING TELEMETRY DATA USING A MANAGEMENT CONTROLLER

(71) Applicant: Dell Products L.P., Round Rock, TX (US)

(72) Inventors: Abeye Teshome, Austin, TX (US); Richard M. Tonry, Georgetown, TX (US); Adolfo Sandor Montero, Pflugerville, TX (US); Bassem El-Azzami, Austin, TX (US); Rajaravi Chandra Kollarapu, Allen, TX (US); Vinodkumar Vasudev Ottar, McKinney, TX (US); Luis Antonio Valencia Reyes, Waxahachie, TX (US); Mohit Arora, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 18/649,223

(22) Filed: Apr. 29, 2024

(65) Prior Publication Data

US 2025/0337669 A1 Oct. 30, 2025

(51) Int. Cl.
*H04L 43/08* (2022.01)

(52) U.S. Cl.
CPC .................................... *H04L 43/08* (2013.01)

(58) Field of Classification Search
CPC ....................................................... H04L 43/08
See application file for complete search history.

(56) References Cited

U.S. PATENT DOCUMENTS

| | | | | |
|---|---|---|---|---|
| 8,042,182 | B2 | 10/2011 | Milani Comparetti et al. | |
| 8,615,785 | B2 | 12/2013 | Elrod et al. | |
| 8,924,620 | B2 | 12/2014 | Harriman et al. | |
| 9,215,244 | B2 | 12/2015 | Ayyagari et al. | |
| 9,734,169 | B2 | 8/2017 | Redlich | |
| 10,176,308 | B2 | 1/2019 | Mintz et al. | |
| 10,298,670 | B2 | 5/2019 | Ben-Shael et al. | |
| 10,671,765 | B2 | 6/2020 | Swierk et al. | |
| 11,036,902 | B2 | 6/2021 | Nicholas | |
| 11,102,122 | B2 | 8/2021 | Seed et al. | |
| 11,134,380 | B2 | 9/2021 | Fox et al. | |
| 11,258,819 | B1 * | 2/2022 | Agarwal | H04L 63/1425 |
| 11,487,274 | B2 | 11/2022 | Valder et al. | |
| 11,792,267 | B2 | 10/2023 | Kreiner et al. | |

(Continued)

OTHER PUBLICATIONS

M. Shahraeini, A New Approach for Classification of Data Transmission Media in Power Systems; IEEE:2010; pp. 1-7.

*Primary Examiner* — Benjamin M Thieu
(74) *Attorney, Agent, or Firm* — WOMBLE BOND DICKINSON (US) LLP

(57) ABSTRACT

Methods and systems for managing telemetry data for endpoint devices are disclosed. Telemetry data may be generated by sensors distributed among sub-systems of an endpoint device. A management controller of the endpoint device may collect the telemetry data from the sensors without traversing in band components of the sub-systems. Therefore, the telemetry data may be aggregated by the management controller regardless of a power or operational state of hardware resources of the sub-systems. The management controller may provide the aggregated telemetry data to a remote server according to a subscription indicated by the remote server.

20 Claims, 8 Drawing Sheets

(56) References Cited

U.S. PATENT DOCUMENTS

| | | | | |
|---|---|---|---|---|
| 11,831,654 | B2 * | 11/2023 | Hinchliffe ............. | H04W 12/10 |
| 11,876,691 | B2 * | 1/2024 | Chang ..................... | G06F 13/28 |
| 2008/0072291 | A1 | 3/2008 | Carley | |
| 2011/0087387 | A1 | 4/2011 | Safa-Bakhsh et al. | |
| 2013/0304761 | A1 | 11/2013 | Redlich | |
| 2017/0094377 | A1 * | 3/2017 | Herdrich ............. | H04L 41/5019 |
| 2017/0353367 | A1 * | 12/2017 | Slaight ................ | H04L 63/0428 |
| 2018/0039946 | A1 | 2/2018 | Bolte et al. | |
| 2021/0034048 | A1 | 2/2021 | Hajizadeh | |
| 2021/0073211 | A1 | 3/2021 | Wright, Sr. | |
| 2022/0038659 | A1 | 2/2022 | Michel | |
| 2022/0107937 | A1 | 4/2022 | Adivi | |
| 2022/0353589 | A1 * | 11/2022 | Chawla .................... | H04Q 9/00 |
| 2023/0110141 | A1 * | 4/2023 | Ramasamy ............ | H01Q 1/245<br>370/252 |
| 2023/0246931 | A1 * | 8/2023 | Chang ..................... | H04L 43/06<br>709/212 |
| 2024/0172331 | A1 | 5/2024 | Koneru | |
| 2024/0430259 | A1 * | 12/2024 | Meller ................ | H04L 63/0227 |
| 2025/0047712 | A1 * | 2/2025 | Sawal ..................... | H04L 63/20 |

* cited by examiner

MANAGING TELEMETRY DATA USING A MANAGEMENT CONTROLLER

FIELD

Embodiments disclosed herein relate generally to managing telemetry data. More particularly, embodiments disclosed herein relate to systems and methods to manage telemetry data across sub-systems of an endpoint device using a management controller of the endpoint device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
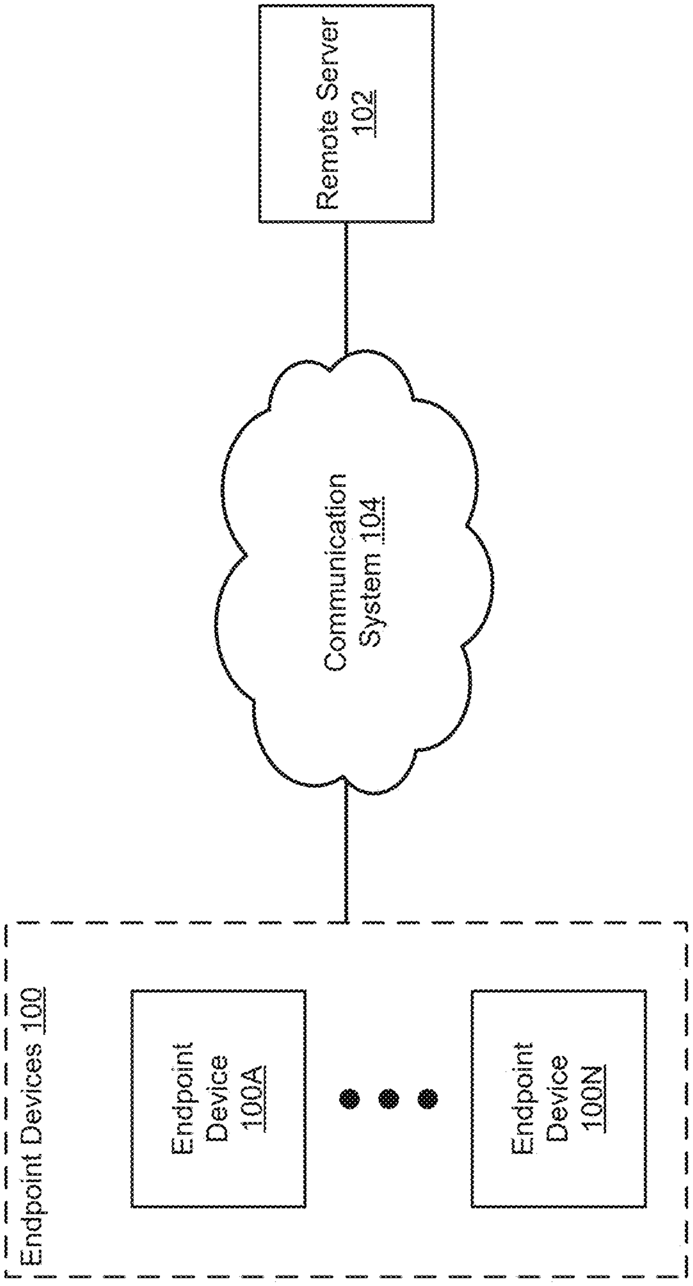
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices. The endpoint devices may include any number of sub-systems (e.g., data processing systems, devices) that may provide computer-implemented services. The computer-implemented services may include any quantity and type of such services. The computer-implemented services may be provided as a result of operation of the sub-systems, which may depend on hardware resources and/or other components operating as intended. Therefore, monitoring operation of the sub-systems may support timely intervention in the event of undesired operation of the sub-systems and, therefore, may support ongoing provision of the computer-implemented services as desired by downstream consumers of the computer-implemented services.

To monitor the operation of the sub-systems, an endpoint device may include any number of sensors distributed across the sub-systems and each sensor may generate operation data indicating operation of a sub-system of the sub-systems. The operation data may include, for example, telemetry data that may be aggregated by the endpoint device. Portions of the telemetry data may be provided to remote entities (e.g., a remote server) for use in monitoring the operation of the endpoint device.

However, in band components of the endpoint device (e.g., hardware resources, in band communication channels) may be subject to failures, which may interfere with obtaining the telemetry data from the sensors. For example, hardware and/or software components of the endpoint device may experience: (i) power failures, (ii) compromise due to malware, (iii) network connectivity issues, and/or (iv) other issues. Therefore, the in band components may not be reliable and/or available to aggregate the telemetry data as desired by the remote server. Unavailability of the telemetry data may result in delayed intervention following undesired operation of at least a portion of the sub-systems. Consequently, computer-implemented services provided by the endpoint device may be interrupted, may be provided at a lower quality, and/or may otherwise be undesirably impacted.

To increase a reliability of telemetry data aggregation and distribution, embodiments disclosed herein relate to methods and systems for managing telemetry data across sub-systems of an endpoint device using a management controller and an out of band communication channel. The management controller and a network module that manages communication channels for the data processing system may be powered separately from hardware resources of the endpoint device. Therefore, the management controller may obtain the telemetry data via data transmission paths that do not include the sub-systems while the hardware resources of the endpoint device are unpowered, compromised, and/or otherwise unavailable. The management controller may aggregate the telemetry data to obtain aggregated telemetry data and may provide at least a portion of the aggregated telemetry data to the remote server via an out of band communication channel that does not traverse in band components of the endpoint device.

By doing so, embodiments disclosed herein may provide a system for managing telemetry data for an endpoint device using out of band methods. A management controller of the endpoint device may respond to requests for telemetry data (e.g., as part of subscriptions indicated by a remote server) regardless of a state (e.g., a power state, a connectivity state, a compromise state) of hardware resources of the endpoint device and without intervention by a user of the endpoint device. Thus, the endpoint device may be more likely to provide computer-implemented services as desired to downstream consumers of the computer-implemented services.

In an embodiment, a method of managing an endpoint device that includes sub-systems is provided. The method may include: obtaining, by a management controller of the endpoint device, telemetry data from a plurality of sensors, the telemetry data indicating operation of the sub-systems and the telemetry data being obtained via a data transmission path that excludes the sub-systems; aggregating, by the management controller, the telemetry data to obtain aggregated telemetry data; and providing, by the management controller and via an out of band communication channel, the aggregated telemetry data to a remote server.

The method may also include: obtaining, by the management controller and via the out of band communication channel, a response to the aggregated telemetry data; and providing, by the management controller, computer-implemented services based at least in part on the response.

The sub-systems may include at least one device selected from a list of devices consisting of: a first device that provides a first portion of the telemetry data to the management controller via a physical interface; a second device that provides a second portion of the telemetry data to the management controller via a side band communication channel of the endpoint device; and a third device that provides a third portion of the telemetry data to the management controller via the out of band communication channel.

The third device may be located remote to the management controller and the third portion of the telemetry data may be obtained from the third device according to a subscription selected by the management controller.

Providing the aggregated telemetry data may include: providing, by the management controller and via the out of band communication channel, a first portion of the telemetry data to the remote server according to a subscription selected by the remote server.

Providing the aggregated telemetry data may also include: identifying, by the management controller, that a second portion of the telemetry data comprises urgent telemetry data; and providing, by the management controller and via the out of band communication channel, the second portion of the telemetry data to the remote server, the second portion of the telemetry data not being provided to the remote server according to the subscription.

The plurality of sensors may be distributed across the sub-systems of the endpoint device.

The telemetry data may be obtained when hardware resources of the endpoint device are unpowered.

The endpoint device may include a network module adapted to separately advertise network endpoints for the management controller and hardware resources of the endpoint device, the network endpoints being usable by the remote server to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

The method may also include: prior to obtaining the telemetry data: advertising, by the management controller and via the out of band channel, access to operation data for the endpoint device; obtaining, by the management controller and via the out of band channel, a subscription request from the remote server that is responsive to the advertising, the subscription request indicating that the remote server desires access to the operation data; and establishing, by the management controller and based on the subscription request, a subscription for the aggregate telemetry data for the remote server.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
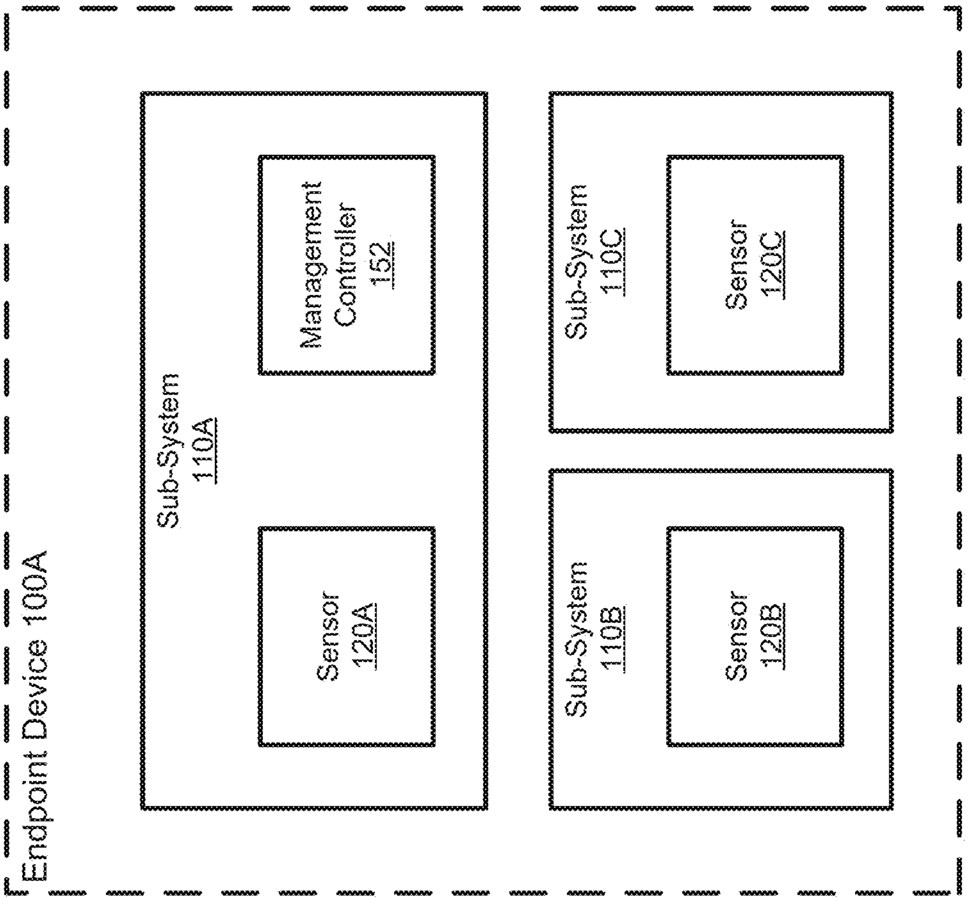
FIG. 1B shows a block diagram illustrating sub-systems and sensors of an endpoint device in accordance with an embodiment.

Turning to FIG. 1A, a block diagram illustrating a distributed environment (e.g., system) in accordance with an embodiment is shown. The system shown in FIG. 1A may provide for management of endpoint devices that may provide, at least in part, computer-implemented services. The system may include any number of endpoint devices 100 (e.g., computing devices) that may each include any number of sub-systems (e.g., devices, data processing systems). Each of the sub-systems may include hardware components (e.g., processors, memory modules, storage devices, communications devices). The hardware components may support execution of any number and types of applications (e.g., software components). Refer to FIG. 1B for additional details regarding the sub-systems.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, endpoint devices 100, remote server 102 and/or any other type of devices (not shown in FIG. 1A). Other types of computer-implemented services may be provided by the system shown in FIG. 1A without departing from embodiments disclosed herein.

To provide the aforementioned computer-implemented services, any of endpoint devices 100 (e.g., 100A, 100N) may need to operate in a predetermined manner. For example, certain hardware components and/or software components of the sub-systems may need to be operational for endpoint devices 100 to provide a desired type and/or quantity of computer-implemented services.

An endpoint device (e.g., 100A) may include any number of sensors tasked with monitoring operation of the sub-systems. While providing the computer-implemented services, the sensors may collect operation data that may include telemetry data (e.g., metrics, events, logs, traces). The telemetry data may be used (e.g., locally, by remote server 102) to monitor performance of endpoint device 100A. For example, remote server 102 may request that certain types and/or quantities of the telemetry data be provided in accordance with a subscription.

By monitoring the performance of endpoint device 100A, undesired operation of any of the sub-systems may be efficiently identified and remedied. In addition, monitoring performance of endpoint device 100A may provide useful insights for potential improvement of the operation of the sub-systems and, therefore, potential improvement in a quality and/or reliability of the computer-implemented services.

However, the in band components of one or more of the sub-systems (e.g., hardware components, the operating system, in band communication channels) may be compromised, inoperable, depowered, and/or otherwise unavailable for use by a user. Therefore, endpoint device 100A may be unable to collect and aggregate telemetry data from each sub-system. Consequently, provision of the telemetry data to remote server 102 (and/or any other entity) may be interrupted thereby causing potential delays and/or a reduction in quality of the computer-implemented services.

In general, embodiments disclosed herein relate to systems, devices, and methods for managing endpoint devices that include sub-systems using out of band methods so that telemetry data may be aggregated and provided to remote systems regardless of a power or operational state of the endpoint devices. Endpoint devices 100 may include out of band components (e.g., a management controller) that may communicate with remote systems (e.g., remote server 102) without traversing in band communication channels and without utilizing the in band components of the sub-systems (e.g., hardware resources of the sub-systems).

To do so, the sub-systems of the endpoint device may host any number of sensors that monitor operation of the endpoint device by collecting operation data. The operation data may include telemetry data such as event logs and/or other metrics usable to investigate performance of the endpoint device. The management controller may communicate with the sensors via transmission paths that exclude the sub-systems. The management controller may request a list of available operation data from each sensor.

Following an identification of available types of operation data, the management controller may advertise, via an out of band communication channel, the available operation data to a remote server (e.g., remote server 102). Remote server 102 may provide a response indicating portions of the available operation data (e.g., telemetry data) that are of interest to remote server 102. The management controller may establish a subscription for remote server 102 based on the requested telemetry data.

The management controller may obtain the telemetry data indicated by the subscription from the sensors and may aggregate the telemetry data to obtain aggregated telemetry data. The management controller may provide the aggregated telemetry data to remote server 102 via the out of band communication channel.

Prior to providing the telemetry data to remote server 102, the management controller may determine whether the telemetry data includes urgent telemetry data (e.g., indicating an operational failure, suspected compromise of a sub-system). If the telemetry data includes urgent telemetry data, the management controller may provide aggregated telemetry data that includes the urgent telemetry data to remote server 102 as it is identified rather than following a schedule indicated by the subscription.

If the telemetry data does not include urgent telemetry data, the management controller may provide the aggregated telemetry data to remote server 102 according to a schedule indicated by the subscription.

To perform the above-mentioned functionality, the system of FIG. 1A may include endpoint devices 100, remote server 102, and/or other components. Endpoint devices 100, remote server 102, and/or any other type of devices not shown in FIG. 1A may perform all, or a portion of the computer-implemented services independently and/or cooperatively. Each of these components is discussed below.

Endpoint devices 100 may include any number and/or type of endpoint devices (e.g., 100A-100N). Any of endpoint devices 100 may include sub-systems that may include in band components (e.g., hardware resources). Any of endpoint devices 100 may also include sub-systems that may include in band components (e.g., hardware resources) and functionality that may allow the out of band components to interact with remote systems independently from the in band components. For more information regarding out of band components of endpoint devices 100, refer to the discussion of FIG. 1C.

Endpoint devices 100 may also include any number of sensors positioned to monitor operation of the sub-systems. The sensors may collect operation data (e.g., telemetry data) and may provide portions of the operation data to the management controller (e.g., upon request, according to a subscription). Refer to FIG. 1B for additional information regarding sub-systems and sensors.

Remote server 102 may be implemented using physical devices located remote to endpoint devices 100 that monitor operation of endpoint devices 100. Remote server 102 may subscribe to telemetry data (e.g., portions of the operation data advertised by the management controller) and may receive aggregated telemetry data via the out of band communication channel. Remote server 102 may utilize the aggregated telemetry data to make decisions, diagnose performance issues, improve performance of endpoint devices 100, and/or for other purposes.

Thus, telemetry data indicating operation of endpoint devices 100 may be provided to remote server 102 using out of band methods. The telemetry data may be obtained and more reliably provided to remote server 102 when implemented using the out of band methods versus in band methods that may rely on availability (e.g., operability, security) of in band components and in band communication channels. The telemetry data may be used to diagnose performance issues of endpoint devices 100 and/or to improve performance thereby improving a quality and/or reliability of the computer-implemented services provided by endpoint devices 100.

Figure 3A:
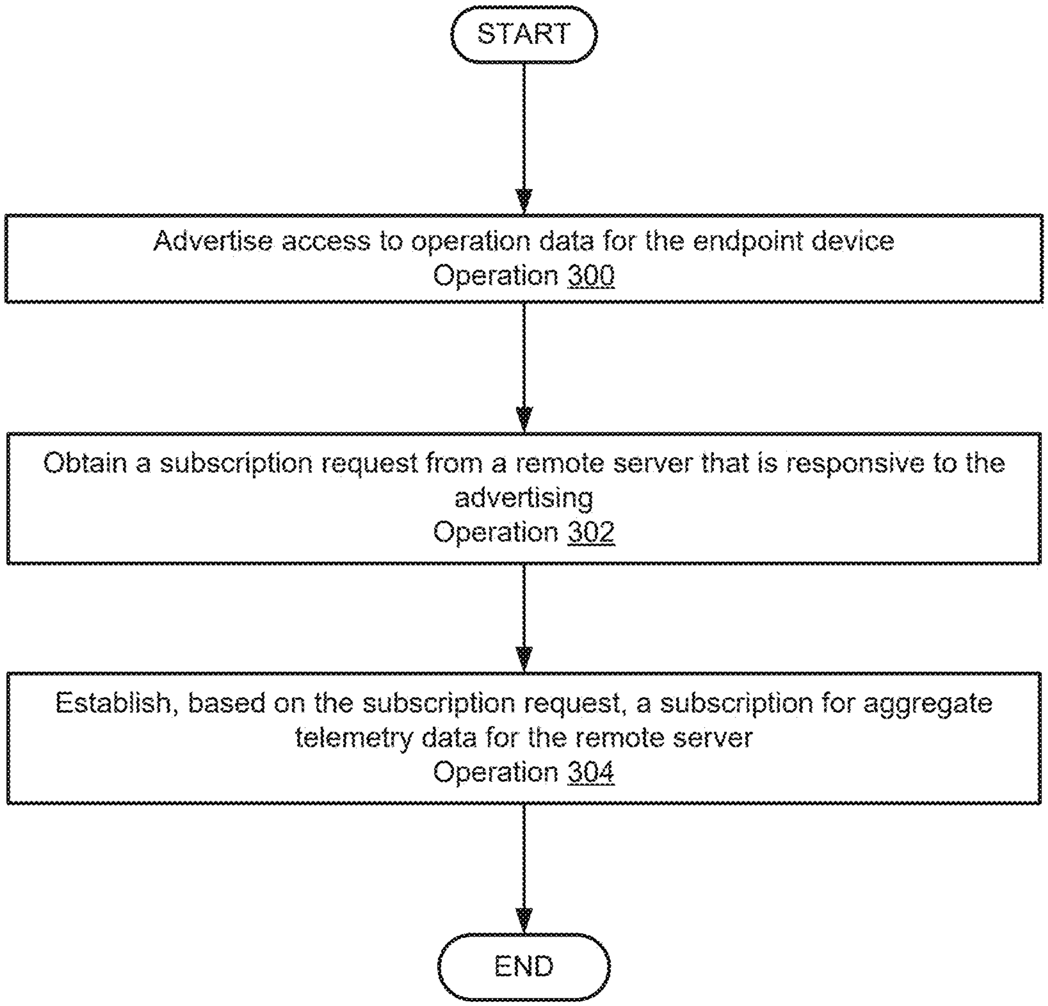
FIGS. 3A-3B show flow diagrams illustrating a method of managing telemetry data across sub-systems of an endpoint device using a management controller in accordance with an embodiment.
Figure 3B:
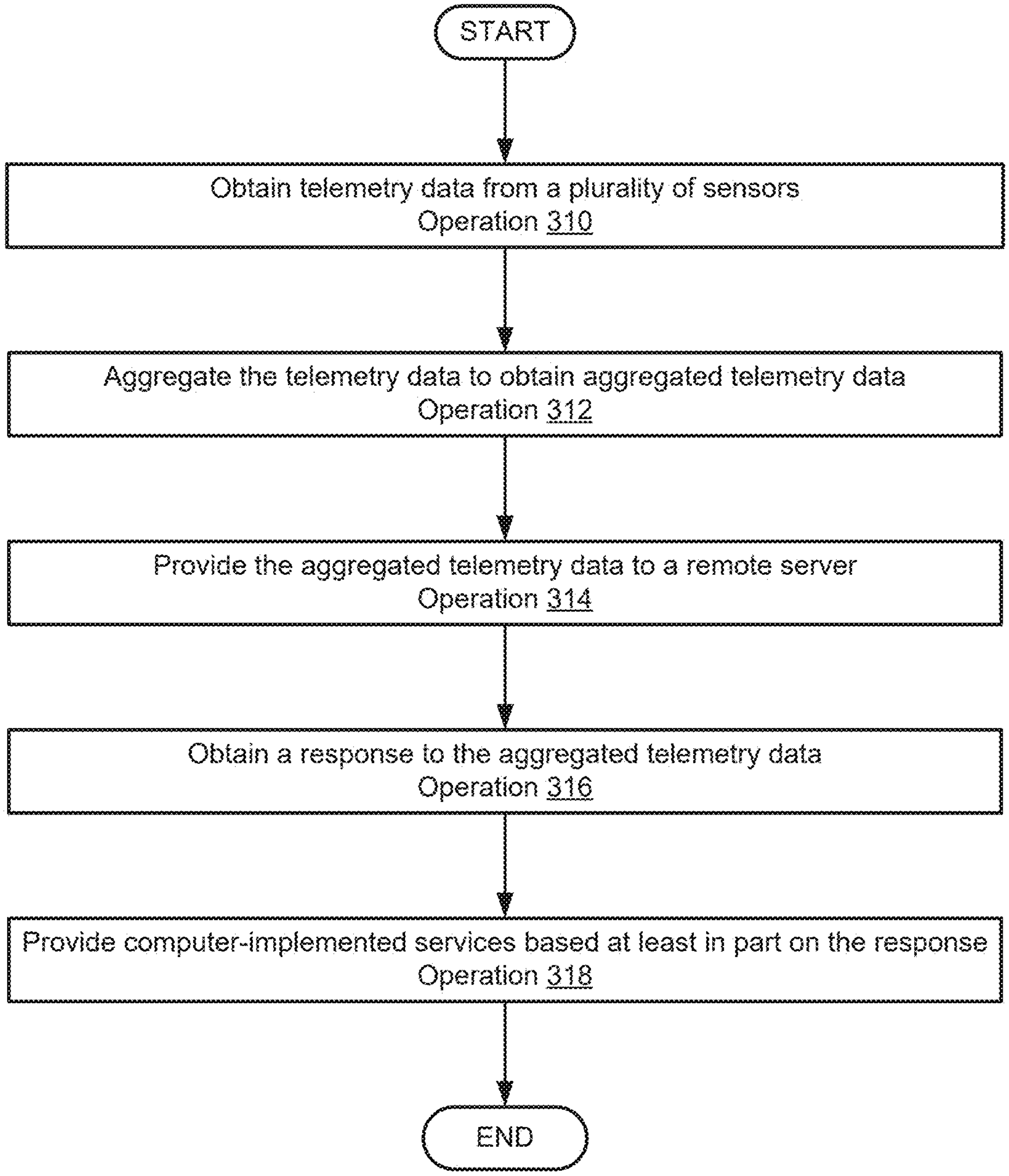

When providing their functionality, any of endpoint devices 100, remote server 102, and/or other devices may perform all, or a portion of the method shown in FIGS. 3A-3B.

Any of (and/or components thereof) endpoint devices 100, and/or remote server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of endpoint devices 100 and/or remote server 102 are implemented using an internet of things (IoT) device, which may include a computing device. The IoT device may operate in accordance with a communication model and/or management model known to endpoint devices 100, remote server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

Communication system 104 may be implemented with one or more local communications links (e.g., a bus interconnecting a processor of any of endpoint devices 100 and remote server 102).

Communication system 104 may include out of band communication channels, in band communication channels, and/or other types of communication channels.

Figure 1C:
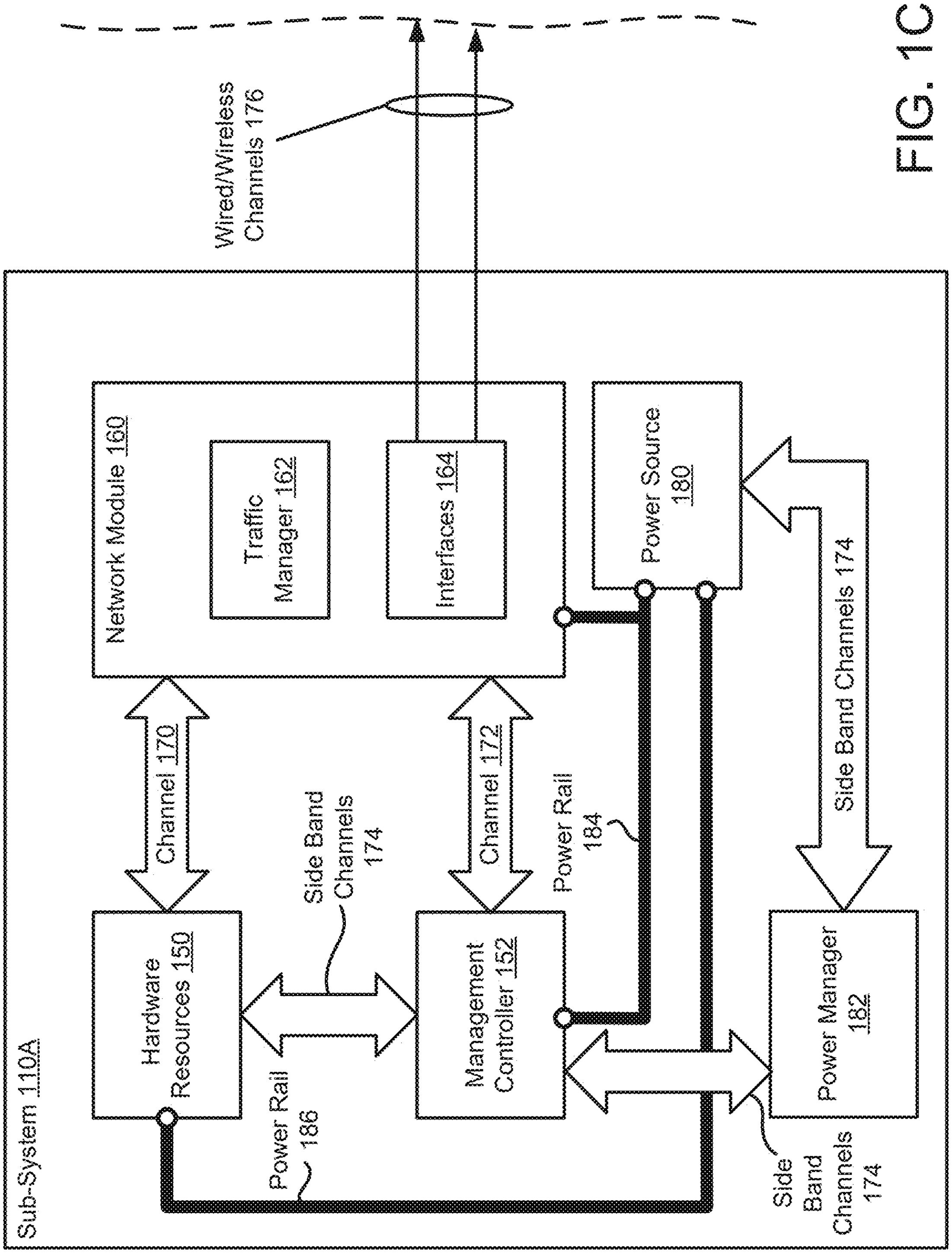
FIG. 1C shows a block diagram illustrating a sub-system of an endpoint device in accordance with an embodiment.

Refer to FIG. 1C for additional details regarding the management controller, network module, out of band communication channel, and/or hardware resources of endpoint devices 100.

While illustrated in FIG. 1A as including a limited number of specific components, a system in accordance with an embodiment may include fewer, additional, and/or different components than those illustrated therein.

Turning to FIG. 1B, a diagram illustrating sub-systems of endpoint device 100A in accordance with an embodiment is shown. Endpoint device 100A may be similar to any of endpoint devices 100 shown in FIG. 1A. Endpoint device 100A may include any number of sub-systems (e.g., 110A, 110B, 110C). Sub-systems 110A-110C may include devices (e.g., data processing systems) and any of sub-systems 110A-110C may be located remote and/or proximate to one other. While shown in FIG. 1B as including three sub-systems, endpoint device 100A (and/or any other endpoint device of endpoint devices 100) may include any number of sub-systems without departing from embodiments disclosed herein.

Sub-system 110A may host management controller 152 and sensor 120A. Management controller 152 may be an out of band component of endpoint device 100A and may be responsible for obtaining and aggregating telemetry data from all sensors associated with endpoint device 100A. Refer to FIG. 1C for additional details regarding management controller 152.

Sensor 120A may be any type of sensor and may collect operation data indicating operation and/or performance of sub-system 110A. For example, sensor 120A may collect telemetry data for sub-system 110A, may collect data related to am ambient environment in which sub-system 110A is positioned, and/or may collect any other type of data. Management controller 152 may receive telemetry data from sensor 120A via a side band communication channel of sub-system 110A, and/or via other transmission paths that do not include in band components (e.g., other hardware resources) of sub-system 110A. By bypassing the in band components (e.g., processors, in band communication channels), management controller 152 may obtain telemetry data from sensor 120A regardless of a power or operation state of sub-system 110A.

Sub-system 110B and sub-system 110C may include devices located remote to sub-system 110A and may each host a sensor (e.g., 120B and 120C respectively). Sensor 120B and sensor 120C may be similar to sensor 120A and may be positioned to collect operation data for sub-system 110B and sub-system 110C. Management controller 152 may receive telemetry data from sensor 120B and sensor 120C via a physical interface that queries sensor 120A for the operation data, via an out of band communication channel, and/or via other data transmission paths that do not include hardware resources (e.g., in band components such as a processor) of sub-systems 110B and 110C.

For example, any of sub-systems 110A-110C may experience a power outage, may be compromised by a malicious entity, may experience network connectivity issues, and/or may otherwise be unable to transmit telemetry data using in band methods. Management controller 152 may be able to request and receive the telemetry data in the aforementioned circumstances using out of band methods thereby increasing a likelihood of providing the telemetry data to a remote server according to the remote server's subscription for telemetry data.

Turning to FIG. 1C, a diagram illustrating sub-system 110A in accordance with an embodiment is shown. Sub-system 110A may be included in an endpoint device similar to any of endpoint devices 100 described in FIG. 1A.

To provide computer-implemented services, sub-system 110A may include any quantity of hardware resources 150. Hardware resources 150 may be in band hardware components, and may include a processor operably coupled to memory, storage, and/or other hardware components. While not shown in FIG. 1C, sub-system 110A may include any number of sensors that may be part of hardware resources 150 and/or may be separate from hardware resources 150. Refer to FIG. 1B for further details regarding sensors.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of sub-system 110A) to another device via any number of intermediate networks (e.g., via wired/wireless channels 176 that are part of the networks).

To reduce the downtime of sub-system 110A and to reduce the likelihood of the applications and/or other in band entities from being indirectly compromised, sub-system 110A may include management controller 152 and network module 160. Each of these components of sub-system 110A is discussed below.

Management controller 152 may be implemented, for example, using a system on a chip or other type of independently operating computing device (e.g., independent from the in band components, such as hardware resources 150, of a host sub-system 110A). Management controller 152 may provide various management functionalities for sub-system 110A. For example, management controller 152 may monitor various ongoing processes performed by the in band components, may manage power distribution, thermal management, and/or other functions of sub-system 110A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

For example, management controller 152 may: (i) obtain telemetry data from a plurality of sensors distributed across sub-systems of endpoint device 100A, (ii) aggregate the telemetry data to obtain aggregated telemetry data, and/or (iii) provide the aggregated telemetry data to a remote server.

The telemetry data may be obtained from any number of sub-systems of the endpoint device (e.g., sub-system 110A, sub-systems 110B-110C described in FIG. 1B). Any of sub-systems 110A-110C may provide portions of the telemetry data to management controller 152 via: (i) a physical interface, (ii) a side band communication channel, (iii) an out of band communication channel (e.g., 172), and/or (iv) other data transmission paths that do not traverse the in band components.

Management controller 152 may be operably connected to communication components of sub-system 110A via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). For example, management controller 152 may direct aggregated telemetry data to remote server 102 via channel 172 (e.g., an out of band channel). Accordingly, compromise of any of hardware resources 150 and hosted component may not result in indirect compromise of any management controller 152, and entities hosted by management controller 152.

To facilitate communication with other devices, sub-system 110A may include network module 160. Network module 160 may provide communication services for in band components and out of band components (e.g., management controller 152) of data processing system. Network module 160 may, for example, host a TCP/IP stack to facilitate network communications via an out of band communication channel. To do so, network module 160 may include traffic manager 162 and interfaces 164.

Traffic manager 162 may include functionality to (i) discriminate traffic directed to various network endpoints advertised by sub-system 110A, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Channel 170 may include an in band channel that services hardware resources 150 and channel 172 may include an out of band channel that services out of band components (e.g., management controller 152). Channel 170 and channel 172 may run through network module 160.

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a WiFi card, a wireless local area network card, a wired local area network card, an optical communication card, and/or other types of communication components. These components may support any number of wired/wireless channels 176.

Network module 160 (e.g., via interfaces 164) may separately advertise network endpoints for management controller 152 and hardware resources 150. Thus, from the perspective of an external device, the in band components and out of band components of sub-system 110A may appear to be two independent network entities, that may independently addressable, and otherwise unrelated to one another.

To facilitate management of sub-system 110A over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

Therefore, if hardware resources 150 become unavailable (e.g., due to being unpowered) then out of band components may remain powered, allowing for transmission of aggregated telemetry data while hardware resources 150 are inoperable. For example, management controller 152 may communicate with remote systems (e.g., remote server 102) in order to obtain information responsive to the aggregated telemetry data, authenticate the information, and/or initiate update processes using the information.

To implement the separate power domains, sub-system 110A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1C, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, sub-system 110A may perform all, or a portion, of the methods and operations illustrated in FIGS. 2A-3B.

While illustrated in FIG. 1C with a limited number of specific components, a system may include additional, fewer, and/or different components without departing from embodiments disclosed herein.

As discussed above, the components of FIGS. 1A-1C may perform various methods to manage telemetry data for endpoint devices that perform computer-implemented services. FIGS. 2A-3B may illustrate examples of methods that may be performed by the components of FIGS. 1A-1C. For example, a management controller and/or other component of an endpoint device may perform all or a portion of the methods. In the diagrams discussed below and shown in FIGS. 2A-3B, any of the operations may be repeated, performed in different orders, and/or performed in parallel with or in a partially overlapping in time manner with other operations.

Figure 2A:
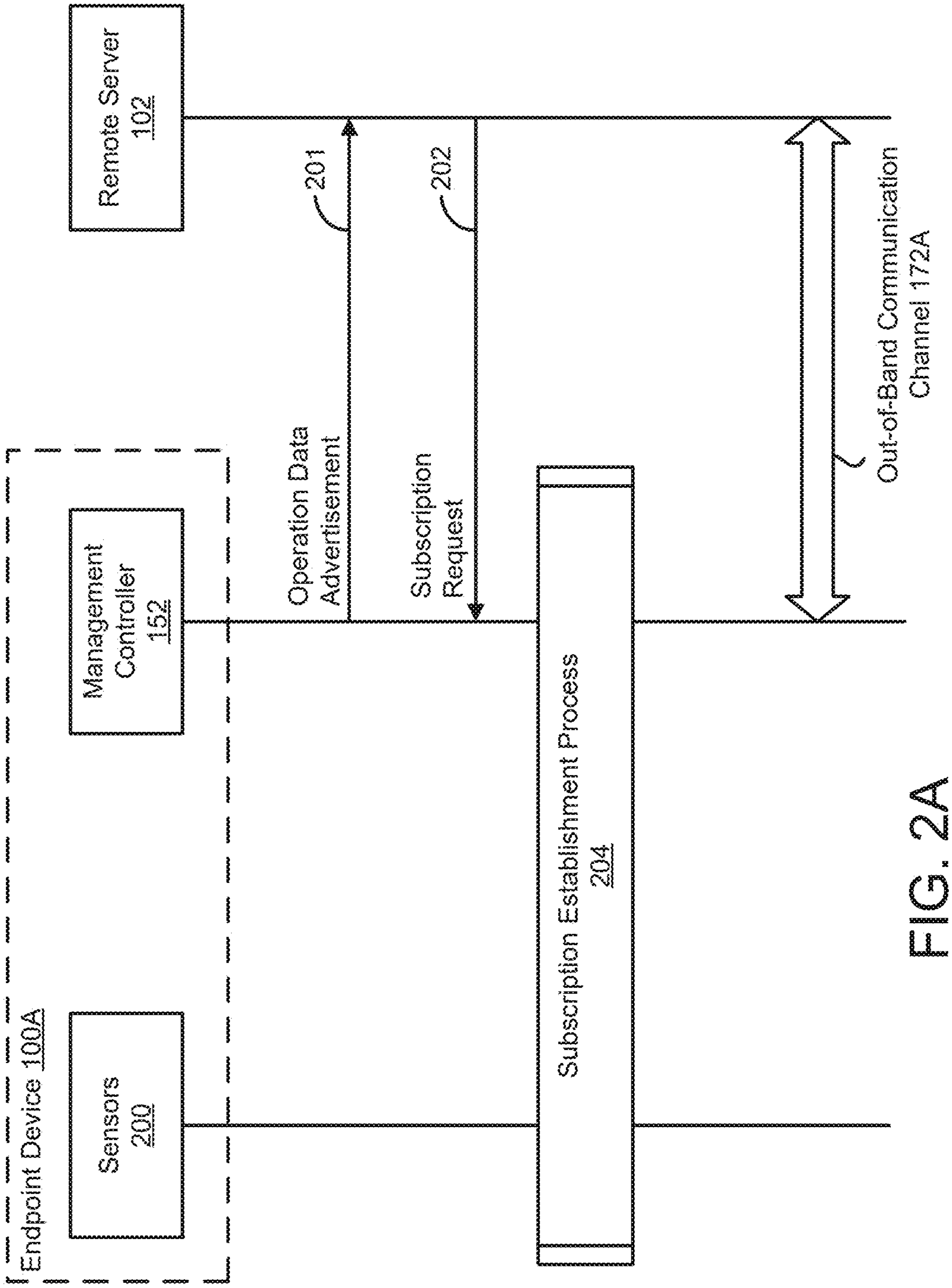
FIGS. 2A-2B show interaction diagrams in accordance with an embodiment.
Figure 2B:
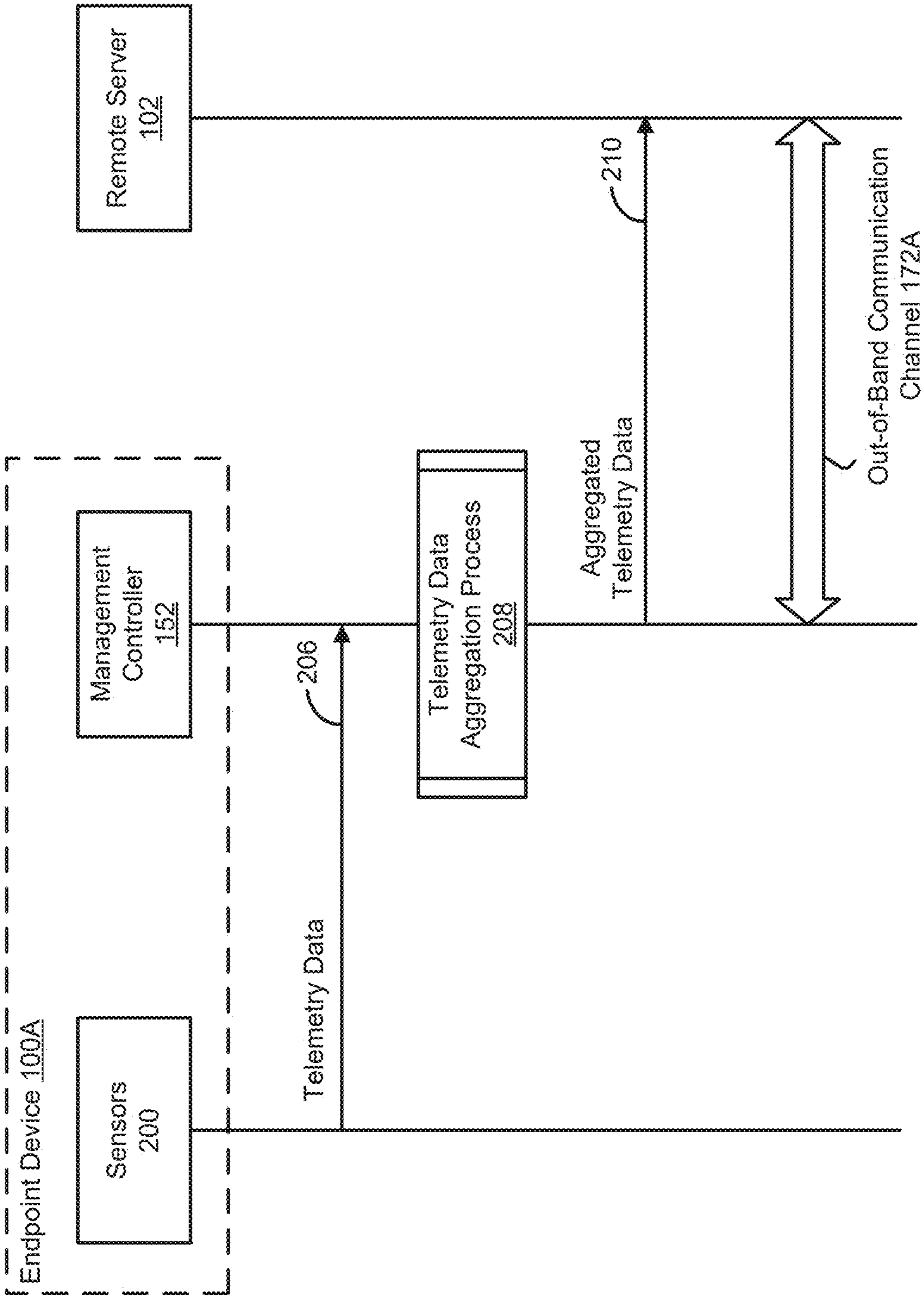

To further clarify embodiments disclosed herein, interaction diagrams in accordance with an embodiment are shown in FIGS. 2A-2B. The interaction diagram may illustrate an example of how data may be obtained and used within the systems of FIGS. 1A-1C.

In the interaction diagrams, processes performed by and interactions between components of a system in accordance with an embodiment are shown. In the diagram, components of the system are illustrated using a first set of shapes (e.g., 200, 152, etc.), located towards the top of each figure. Lines descend from these shapes. Processes performed by the components of the system are illustrated using a second set of shapes (e.g., 204) superimposed over these lines.

Interactions (e.g., communication, data transmissions, etc.) between the components of the system are illustrated using a third set of shapes (e.g., 201, 202, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 201 may occur prior to the interaction labeled as 202. However, it will be appreciated that the processes and interactions may be performed in different orders, any may be omitted, and other processes or interactions may be performed without departing from embodiments disclosed herein.

The processes shown in FIGS. 2A-2B may be performed by any entity shown in the systems of FIGS. 1A-1C (e.g., a device similar to one of endpoint devices 100, systems similar to remote server 102, etc.) and/or another entity without departing from embodiments disclosed herein.

Turning to FIG. 2A, a first interaction diagram in accordance with an embodiment is shown. The first interaction diagram may illustrate processes and interactions that may occur when managing subscriptions for telemetry data of an endpoint device for a remote server. As discussed with respect to FIGS. 1A-1C, endpoint device 100A may include sensors 200 and management controller 152. Sensors 200 may be hardware components of endpoint device 100A similar to any of hardware resources 150 described in FIG. 1C and/or may be similar to any of sensors 120A-C described in FIG. 1B.

Endpoint device 100A may provide computer-implemented services. To monitor performance of endpoint device 100A, sensors 200 may be distributed among any number of sub-systems of endpoint device 100A. Sensors 200 may collect operation data for the sub-systems and may advertise availability of the operation data to management controller 152 (not shown). The operation data may be usable (e.g., by management controller 152, by remote server 102) to diagnose undesirable operation of endpoint device 100A and/or to improve performance to increase a quality and/or reliability of the computer-implemented services.

At interaction 201, an operation data advertisement may be provided to remote server 102 by management controller 152. For example, the operation data advertisement may be generated by management controller 152 and may be provided to remote server 102 via out of band communication channel 172A through (i) transmission via a message, (ii) storing in a storage with subsequent retrieval by remote server 102, (iii) a publish-subscribe system where remote server 102 subscribes to updates from management controller 152 thereby causing a copy of the operation data advertisement to be propagated to remote server 102, and/or (iv) other processes.

The operation data advertisement may include a list of all operation data available to management controller 152. Specifically, management controller 152 may compile the list in response to advertisement of the operation data by sensors 200 to management controller 152 (not shown). By providing the operation data advertisement to remote server 102, remote server 102 may identify portions of the operation data to be included in a subscription request. Doing so may initiate a process of establishing a subscription for remote server 102 so that the desired portions of the operation data may be provided to remote server 102 in accordance with a pre-defined schedule, etc.

At interaction 202, a subscription request may be provided to management controller 152 by remote server 102. For example, the subscription request may be generated by remote server 102 and may be provided to management controller 152 via out of band communication channel 172A through (i) transmission via a message, (ii) storing in a storage with subsequent retrieval by management controller 152, (iii) a publish-subscribe system where management controller 152 subscribes to updates from remote server 102 thereby causing a copy of the subscription request to be propagated to management controller 152, and/or (iv) other processes.

The subscription request may include a list of telemetry data (e.g., portions of the available operation data) desired to be provided to remote server 102, the subscription request therefore indicating that remote server 102 desires access to (at least a portion of) the operation data. The subscription request may also include supplemental information indicating a preferred schedule for transmission of the aggregate telemetry data, and/or other terms of the requested subscription. Specifically, management controller 152 may compile the list in response to advertisement of the operation data by sensors 200. By providing the subscription request to management controller 152, management controller 152 may establish a subscription for remote server 102.

Following receipt of the subscription request, management controller 152 may perform subscription establishment process 204 cooperatively with sensors 200. During subscription establishment process 204, management controller 152 may: (i) read the requested telemetry data from the subscription request, (ii) provide a request for management controller 152 to subscribe to the requested telemetry data to sensors 200, (iii) establish a schedule for transmission of the aggregate telemetry data to remote server 102, and/or (iv) perform other actions to establish the subscription for remote server 102. Subscription establishment process 204 may also include establishment of supplementary policies indicating that urgent telemetry data is to be provided to remote server 102 not according to the pre-defined schedule.

By doing so, management controller 152 may establish subscriptions to facilitate provision of telemetry data from sensors 200 to remote server 102 using out of band methods. By utilizing the out of band methods (e.g., by transmitting the telemetry data via out of band communication channel 172A), the telemetry data may be provided to remote server 102 regardless of a power or operation state of endpoint device 100A. Reliably providing the telemetry data to remote server 102 may allow for increased monitoring of performance of endpoint device 100A and, therefore, an increased likelihood of endpoint device 100A providing computer-implemented services as desired.

Turning to FIG. 2B, a second interaction diagram in accordance with an embodiment is shown. The second interaction diagram may illustrate processes and interactions that may occur when managing provision of telemetry data to a remote server using out of band methods. As discussed with respect to FIGS. 1A-1C, endpoint device 100A may include sensors 200 and management controller 152. Sensors 200 may be hardware components of endpoint device 100A similar to any of hardware resources 150 described in FIG. 1C and/or may be similar to any of sensors 120A-C described in FIG. 1B.

At interaction 206, telemetry data may be provided to management controller 152 by sensors 200. The telemetry data may indicate operation of the sub-systems of endpoint device 100A. For example, the telemetry data may be generated by sensors 200 and may be provided to management controller 152 via out of band communication channel 172A through (i) transmission via a message, (ii) storing in a storage with subsequent retrieval by management controller 152, (iii) a publish-subscribe system where management controller 152 subscribes to updates from sensors 200 thereby causing a copy of the telemetry data to be propagated to management controller 152, and/or (iv) other processes.

Sensors 200 may include any number of sensors that may be distributed among any number of sub-systems of endpoint device 100A (not shown). Refer to FIG. 1B for a description of sub-systems of an endpoint device. The any number of sub-systems may include: (i) a first device that provides a first portion of the telemetry data to management controller 152 via a physical interface, (ii) a second device that provides a second portion of the telemetry data to management controller 152 via a side band communication channel of endpoint device 100A, (iii) a third device that provides a third portion of the telemetry data to the management controller via out of band communication channel 172A, and/or (iv) other devices. Each of these devices, therefore, may utilize a data transmission path that excludes the sub-systems (e.g., in band hardware resources and/or in band communication channels of the sub-systems).

The first device may be a sub-system of endpoint device 100A similar to any of sub-systems 110A-110C described in FIGS. 1B-1C. The first device may include at least a first sensor (e.g., of sensors 200). Communication channels not illustrated in FIGS. 1B-1C may exist between the first sensor and hardware resources 150. To provide the first portion of the telemetry data, hardware resources 150 may include a communication chip that may obtain the first portion of the telemetry data from the first sensor and may provide the first portion of the telemetry data directly to management controller 152 without traversing side band channels 174 and/or any in band channels (e.g., 170).

The second device may be a sub-system of endpoint device 100A that also hosts management controller 152 (e.g., sub-system 110A). The second device may also host a second sensor (e.g., of sensors 200). As described in FIG. 1C, management controller 152 may utilize side band channels 174 to query the second sensor for the second portion of the telemetry data and to receive the second portion of the telemetry data without traversing channel 170 (e.g., in band channels).

The third device may be a sub-system of endpoint device 100A that is located remote to the management controller. The third device may be similar to any of sub-systems 110B and 110C described in FIG. 1B. The third device may host at least a third sensor (e.g., of sensors 200) and the third sensor may direct the third portion of the telemetry data directly to a network endpoint associated with management controller 152 via out of band communication channel 172A.

By providing the telemetry data via data transmission paths that exclude the sub-systems, the telemetry data may be obtained from sensors 200 regardless of a power or operational state of the sub-systems. For example, the telemetry data may be obtained when hardware resources of endpoint device 100A are unpowered.

While described above as including three sub-systems and three sensors, endpoint device 100A may include any number of sub-systems and any number of sensors without departing from embodiments disclosed herein.

Once the telemetry data is obtained by management controller 152 from sensors 200 (e.g., the first portion of the telemetry data from the first device, the second portion of the telemetry data from the second device, the third portion of the telemetry data from the third device), management controller 152 may perform telemetry data aggregation process 208.

During telemetry data aggregation process 208, management controller 152 may verify that the telemetry data matches types and/or quantities of telemetry data indicated by the subscription. Management controller 152 may also determine, during telemetry data aggregation process 208, whether any portions of the obtained telemetry data include urgent telemetry data. Urgent telemetry data may include any information indicating undesirable performance of a sub-system of endpoint device 100A, any information indicating possible compromise of a sub-system of endpoint device 100A, and/or any other type of information labeled as urgent telemetry data.

During telemetry data aggregation process 208, management controller 152 may perform data processing such as cleaning and organizing the telemetry data. The data processing may include other data analysis processes to generate statistics related to the telemetry data. The statistics, the cleaned telemetry data, and/or other information (e.g., data summaries) may be compiled as aggregated telemetry data and encapsulated into a data structure. Encapsulating the aggregated telemetry data may include cryptographically signing the aggregated telemetry data and/or other processes.

At interaction 210, the aggregated telemetry data may be provided to remote server 102 by management controller 152. For example, the aggregated telemetry data may be generated by management controller 152 and may be provided to remote server 102 via out of band communication channel 172A through (i) transmission via a message, (ii) storing in a storage with subsequent retrieval by remote server 102, (iii) a publish-subscribe system where remote server 102 subscribes to updates from management controller 152 thereby causing a copy of the aggregated telemetry data to be propagated to remote server 102, and/or (iv) other processes.

As previously discussed, management controller 152 may determine whether the telemetry data includes urgent telemetry data. If the telemetry data is not determined to include urgent telemetry data, the aggregated telemetry data may be provided according to a subscription indicated by remote server 102. Refer to FIG. 2A for a discussion of establishing a subscription for remote server 102. If the telemetry data is determined to include urgent telemetry data, management controller 152 may not provide the aggregated telemetry data according to the subscription. For example, management controller 152 may process, compile, and transmit the aggregated telemetry data as soon as the urgent telemetry data is received by management controller 152, and/or at another time that does not follow a pre-defined schedule indicated by the subscription. By doing so, remote server 102 may have access to the urgent telemetry data and may more efficiently determine an appropriate response to the urgent telemetry data.

Thus, as shown in the example of FIG. 2B, telemetry data may be managed using out of band methods. Out of band components of endpoint device 100A may collect, aggregate, and provide telemetry data to remote server 102 without traversing potentially unavailable and/or compromised in band components of endpoint device 100A. By doing so, performance of sub-systems of endpoint device 100A may be monitored by remote server 102 regardless of a power or operation state of hardware resources of endpoint device 100A. Therefore, remote server 102 may diagnose potential problems, provide instructions to endpoint device 100A to improve performance, and thereby increase a likelihood of endpoint device 100A providing computer-implemented services as desired by downstream consumers of the computer-implemented services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage telemetry data for endpoint devices using out of band methods. By doing so, a quality and/or reliability of the computer-implemented services may be increased.

Turning to FIG. 3A, a first flow diagram illustrating a method of establishing a subscription for telemetry data in accordance with an embodiment is shown. In the diagram discussed below and shown in FIG. 3A, any of the operations may be repeated, performed in different orders, and/or performed in parallel with or in a partially overlapping in time manner with other operations. The method described with respect to FIG. 3A may be performed by an endpoint device, any component of an endpoint device (e.g., a management controller, hardware resources), a remote server, and/or another device.

At operation 300, access to operation data for the endpoint device may be advertised. Advertising access to the operation data may include: (i) identifying a list of available operation data, the available operation data being collected by a plurality of sensors distributed among sub-systems of the endpoint device (ii) providing, to an entity desiring access to the operation data (e.g., a remote server) the list of the available operation data, and/or (iii) other methods. Refer to FIG. 2A for additional details regarding advertising access to the operation data.

At operation 302, a subscription request may be obtained from a remote server that is responsive to the advertising. Obtaining the subscription request may include: (i) reading the subscription request from storage, (ii) receiving the subscription request from the remote server as a message over a communication system, and/or (iii) other methods. The subscription request may be directed to a network endpoint associated with a management controller of the endpoint device. Therefore, the management controller may receive the subscription request via an out of band communication channel.

At operation 304, a subscription may be established for aggregate telemetry data based on the subscription request. Establishing the subscription may include: (i) requesting a second subscription for telemetry data (e.g., portions of the operation data requested to be included in the subscription for the remote server) from the plurality of sensors, the second subscription for the telemetry data indicating a schedule for the plurality of sensors to provide the telemetry data (e.g., to a management controller of the endpoint device), (ii) instantiating a schedule for aggregating the telemetry data and providing the aggregated telemetry data to the remote server, and/or (iii) other methods. Establishing the subscription may also include: (i) storing a copy of the list of the desired portions of the operation data indicated by the subscription request from the remote server, (ii) storing a copy of the schedule for transmission of the aggregated telemetry data, (iii) providing a copy of the subscription data (e.g., the list of desired telemetry data, the schedule) to another entity responsible for managing the subscription, and/or (iv) other methods.

The method may end following operation 304.

Turning to FIG. 3B, a second flow diagram illustrating a method of managing telemetry data in accordance with an embodiment is shown. In the diagram discussed below and shown in FIG. 3B, any of the operations may be repeated, performed in different orders, and/or performed in parallel with or in a partially overlapping in time manner with other operations. The method described with respect to FIG. 3B may be performed by an endpoint device, any component of an endpoint device (e.g., a management controller, hardware resources), a remote server, and/or another device.

At operation 310, telemetry data may be obtained from a plurality of sensors. Obtaining the telemetry data may include: (i) reading the telemetry data from storage, (ii) receiving the telemetry data over a data transmission path, (iii) generating the telemetry data, and/or (iv) other methods. Refer to FIG. 2B for additional details regarding obtaining the telemetry data.

Receiving the telemetry data over a transmission path may include: (i) querying a communication chip of hardware resources of the endpoint device, the hardware resources having access to the telemetry data obtained via a physical interface from a sensor, (ii) receiving a second portion of the telemetry data via a side band communication channel of the endpoint device, (iii) receiving via an out of band communication channel, the telemetry data from a sensor in accordance with a subscription (e.g., following a schedule for telemetry data transmission to the management controller), and/or (iv) other methods.

At operation 312, the telemetry data may be aggregated to obtain aggregated telemetry data. Aggregating the telemetry data may include: (i) organizing and/or cleaning the telemetry data, (ii) processing the telemetry data, (iii) generating one or more statistics related to the data, (iv) generating a data summary for the telemetry data, (v) compiling the telemetry data along with any statistics and/or summaries to generate a data structure, and/or (vi) other methods.

Aggregating the telemetry data may also include providing the telemetry data to another entity responsible for performing at least a portion of the data aggregation and receiving the aggregated telemetry data as a response from the entity.

At operation 314, the aggregated telemetry data may be provided to a remote server. Providing the aggregated telemetry data may include providing, via the out of band communication channel, a first portion of the telemetry data to the remote server according to a subscription selected by the remote server. Providing the first portion of the telemetry data to the remote server according to the subscription may include: (i) identifying, based on the subscription, a type and/or quantity of the aggregated telemetry data to be provided to the remote server along with a schedule for providing the aggregated telemetry data, (ii) transmitting, according to the schedule, the aggregated telemetry data indicated by the subscription as a message over the out of band communication channel, and/or (iii) other methods.

Providing the aggregated telemetry data may also include: (i) identifying that a second portion of the telemetry data includes urgent telemetry data, (ii) providing, via the out of band communication channel, the second portion of the telemetry data to the remote server, the second portion of the telemetry data not being provided to the remote server according to the subscription, and/or (iii) other methods.

The second portion of the telemetry data may be aggregated separately from the rest of the telemetry data, may be aggregated along with the rest of the telemetry data, and/or may be provided in an unprocessed form to the remote server. To provide the second portion of the telemetry data to the remote server not according to the subscription, the second portion of the telemetry data may be transmitted upon identification of the urgent telemetry data. Providing the second portion of the telemetry data to the remote server may also include: (i) transmitting a notification to the remote server indicating that the urgent telemetry data was identified, (ii) receiving, in response to the notification, a request for the urgent telemetry data, and/or (iii) providing, at least the urgent telemetry data to the remote server.

At operation 316, a response to the aggregated telemetry data may be obtained. The response to the aggregated telemetry data may include instructions, the instructions indicating modifications to be made to operation of the endpoint device. The instructions may include: (i) actions to be performed to further interrogate undesired operation of a sub-system of the endpoint device, (ii) actions to be performed to remediate undesired operation of a sub-system of the endpoint device, (iii) actions to be performed to improve performance of a sub-system of the endpoint device, and/or (iv) any other instructions that may impact operation of one or more sub-systems of the endpoint device.

Obtaining the response may include: (i) reading the response from a shared storage with the remote server, (ii) receiving the response as a message transmitted over the out of band communication channel, and/or (iii) other methods.

At operation 318, computer-implemented services may be provided based at least in part on the response. Providing the computer-implemented services may include: (i) modifying operation of at least a portion of the sub-systems based on the response to obtain an updated sub-system, (ii) operating the updated sub-system to provide the computer-implemented services, and/or (iii) other methods. Modifying the operation of the at least a portion of the sub-systems may include modifying software components hosted by hardware resources of the sub-system and/or other modifications.

The method may end following operation 318.

As illustrated above, embodiments disclosed herein may provide systems and methods usable to manage telemetry data for endpoint devices. Telemetry data for the endpoint device may be collected and aggregated, at least in part, using out of band methods so that inoperable in band components and/or potentially compromised in band channels may be circumvented. By doing so, computer-implemented services provided by and/or to the endpoint device may be more efficiently managed than when relying on the in band methods.

Figure 4:
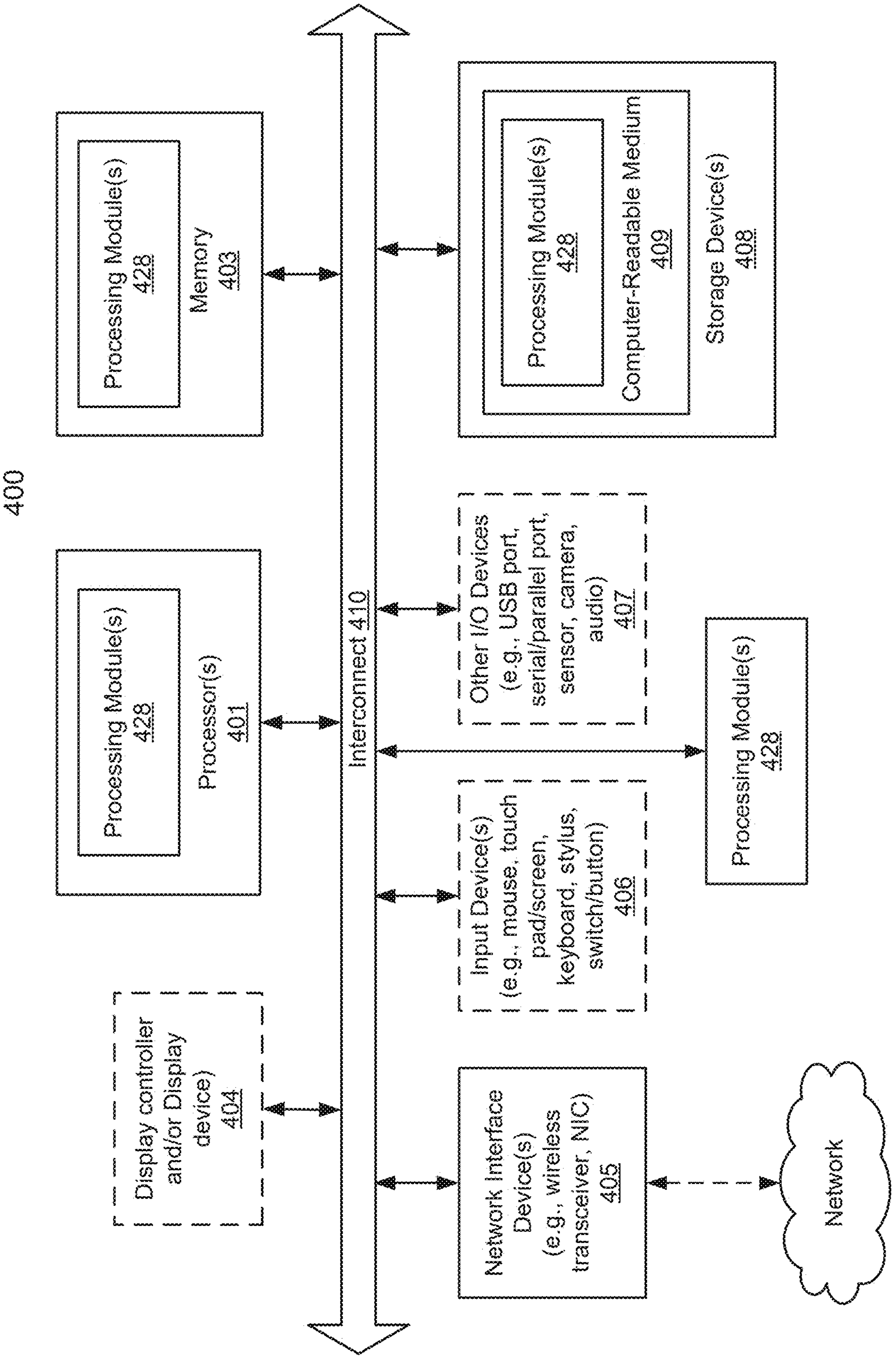
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an endpoint device that comprises sub-systems, the method comprising:

obtaining, by a management controller of the endpoint device, telemetry data from a plurality of sensors, the telemetry data indicating operation of the sub-systems and the telemetry data being obtained via a data transmission path that excludes the sub-systems;

aggregating, by the management controller, the telemetry data to obtain aggregated telemetry data; and providing, by the management controller and via an out of band communication channel, the aggregated telemetry data to a remote server by:

providing, by the management controller and via the out of band communication channel, a first portion of the telemetry data to the remote server according to a subscription selected by the remote server;

identifying, by the management controller, that a second portion of the telemetry data comprises urgent telemetry data; and providing, by the management controller and via the out of band communication channel, the second portion of the telemetry data to the remote server, the second portion of the telemetry data not being provided to the remote server according to the subscription.

2. The method of claim 1, further comprising:

obtaining, by the management controller and via the out of band communication channel, a response to the aggregated telemetry data; and providing, by the management controller, computer-implemented services based at least in part on the response.

3. The method of claim 1, wherein the sub-systems comprise at least one device selected from a list of devices consisting of:

a first device that provides a first portion of the telemetry data to the management controller via a physical interface;

a second device that provides a second portion of the telemetry data to the management controller via a side band communication channel of the endpoint device; and a third device that provides a third portion of the telemetry data to the management controller via the out of band communication channel.

4. The method of claim 3, wherein the third device is located remote to the management controller and the third portion of the telemetry data is obtained from the third device according to a subscription selected by the management controller.

5. The method of claim 1, wherein the plurality of sensors is distributed across the sub-systems of the endpoint device.

6. The method of claim 1, wherein the telemetry data is obtained when hardware resources of the endpoint device are unpowered.

7. The method of claim 1, wherein the endpoint device comprises a network module adapted to separately advertise network endpoints for the management controller and hardware resources of the endpoint device, the network endpoints being usable by the remote server to address communications to the hardware resources and the management controller.

8. The method of claim 7, wherein the management controller and the network module are on separate power domains from the hardware resources so that the management controller and the network module are operable while the hardware resources are inoperable.

9. The method of claim 7, wherein the out of band communication channel runs through the network module, and an in band communication channel that services the hardware resources also runs through the network module.

10. The method of claim 7, wherein the network module hosts a transmission control protocol/internet protocol (TCP/IP) stack to facilitate network communications via the out of band communication channel.

11. The method of claim 7, further comprising:

prior to obtaining the telemetry data:

advertising, by the management controller and via the out of band channel, access to operation data for the endpoint device;

obtaining, by the management controller and via the out of band channel, a subscription request from the remote server that is responsive to the advertising, the subscription request indicating that the remote server desires access to the operation data; and establishing, by the management controller and based on the subscription request, a subscription for the aggregate telemetry data for the remote server.

12. A non-transitory machine-readable medium having instructions stored therein, which when executed by a processor, cause the processor to perform operations for managing an endpoint device that comprises sub-systems, the operations comprising:

obtaining, by a management controller of the endpoint device, telemetry data from a plurality of sensors, the telemetry data indicating operation of the sub-systems and the telemetry data being obtained via a data transmission path that excludes the sub-systems;

aggregating, by the management controller, the telemetry data to obtain aggregated telemetry data; and providing, by the management controller and via an out of band communication channel, the aggregated telemetry data to a remote server by:

providing, by the management controller and via the out of band communication channel, a first portion of the telemetry data to the remote server according to a subscription selected by the remote server;

identifying, by the management controller, that a second portion of the telemetry data comprises urgent telemetry data; and providing, by the management controller and via the out of band communication channel, the second portion of the telemetry data to the remote server, the second portion of the telemetry data not being provided to the remote server according to the subscription.

13. The non-transitory machine-readable medium of claim 12, further comprising:

obtaining, by the management controller and via the out of band communication channel, a response to the aggregated telemetry data; and providing, by the management controller, computer-implemented services based at least in part on the response.

14. The non-transitory machine-readable medium of claim 12, wherein the sub-systems comprise at least one device selected from a list of devices consisting of:

a first device that provides a first portion of the telemetry data to the management controller via a physical interface;

a second device that provides a second portion of the telemetry data to the management controller via a side band communication channel of the endpoint device; and a third device that provides a third portion of the telemetry data to the management controller via the out of band communication channel.

15. The non-transitory machine-readable medium of claim 14, wherein the third device is located remote to the management controller and the third portion of the telemetry data is obtained from the third device according to a subscription selected by the management controller.

16. A data processing system, comprising:

a processor; and a memory coupled to the processor to store instructions, which when executed by the processor, cause the processor to perform operations for managing an endpoint device that comprises sub-systems, the operations comprising:

obtaining, by a management controller of the endpoint device, telemetry data from a plurality of sensors, the telemetry data indicating operation of the sub-systems and the telemetry data being obtained via a data transmission path that excludes the sub-systems;

aggregating, by the management controller, the telemetry data to obtain aggregated telemetry data; and providing, by the management controller and via an out of band communication channel, the aggregated telemetry data to a remote server by:

providing, by the management controller and via the out of band communication channel, a first portion of the telemetry data to the remote server according to a subscription selected by the remote server;

identifying, by the management controller, that a second portion of the telemetry data comprises urgent telemetry data; and providing, by the management controller and via the out of band communication channel, the second portion of the telemetry data to the remote server, the second portion of the telemetry data not being provided to the remote server according to the subscription.

17. The data processing system of claim 16, further comprising:

obtaining, by the management controller and via the out of band communication channel, a response to the aggregated telemetry data; and providing, by the management controller, computer-implemented services based at least in part on the response.

18. The data processing system of claim 16, wherein the sub-systems comprise at least one device selected from a list of devices consisting of:

a first device that provides a first portion of the telemetry data to the management controller via a physical interface;

a second device that provides a second portion of the telemetry data to the management controller via a side band communication channel of the endpoint device; and a third device that provides a third portion of the telemetry data to the management controller via the out of band communication channel.

19. The data processing system of claim 16, wherein the plurality of sensors is distributed across the sub-systems of the endpoint device.

20. The data processing system of claim 16, wherein the telemetry data is obtained when hardware resources of the endpoint device are unpowered.

* * * * *